(12) United States Patent
Dai et al.

(10) Patent No.: US 11,502,287 B2
(45) Date of Patent: Nov. 15, 2022

(54) METHOD OF MANUFACTURING AN ELECTROCHEMICAL CELL

(71) Applicant: GM GLOBAL TECHNOLOGY OPERATIONS LLC, Detroit, MI (US)

(72) Inventors: Fang Dai, Troy, MI (US); Shuru Chen, Troy, MI (US); Meinan He, Sterling Heights, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 16/131,884

(22) Filed: Sep. 14, 2018

(65) Prior Publication Data

US 2019/0207208 A1 Jul. 4, 2019

Related U.S. Application Data

(63) Continuation-in-part of application No. 15/862,187, filed on Jan. 4, 2018, now Pat. No. 10,797,353.

(51) Int. Cl.
*H01M 4/14* (2006.01)
*H01M 4/66* (2006.01)
(Continued)

(52) U.S. Cl.
CPC ....... *H01M 4/1395* (2013.01); *H01M 4/0404* (2013.01); *H01M 4/0419* (2013.01);
(Continued)

(58) Field of Classification Search
CPC .. H01M 4/1395; H01M 4/0419; H01M 4/134; H01M 4/366; H01M 4/661
See application file for complete search history.

(56) References Cited

U.S. PATENT DOCUMENTS

| 4,162,202 A | 7/1979 | Dey |
| 4,508,608 A | 4/1985 | Palmer |

(Continued)

FOREIGN PATENT DOCUMENTS

| CN | 102339982 A | 2/2012 |
| CN | 105154849 A | 12/2015 |

(Continued)

OTHER PUBLICATIONS

Liu, Y. et al.; Lithium-coated polymeric matrix as a minimum volume change and dendrite-free lithium metal anode; nature Communications; DOI: 10.1038/ncomms10992; pp. 1-9.

(Continued)

*Primary Examiner* — Ula C Ruddock
*Assistant Examiner* — Frank A Chernow
(74) *Attorney, Agent, or Firm* — Harness, Dickey & Pierce, P.L.C.

(57) ABSTRACT

In a method of manufacturing an electrochemical cell, a porous or non-porous metal substrate may be provided. A precursor solution may be applied to a surface of the metal substrate. The precursor solution may comprise a chalcogen donor compound dissolved in a solvent. The precursor solution may be applied to the surface of the metal substrate such that the chalcogen donor compound reacts with the metal substrate and forms a conformal metal chalcogenide layer on the surface of the metal substrate. A conformal lithium metal layer may be formed on the surface of the metal substrate over the metal chalcogenide layer.

18 Claims, 1 Drawing Sheet

(51) Int. Cl.
  *H01M 4/36* (2006.01)
  *H01M 4/1395* (2010.01)
  *H01M 4/58* (2010.01)
  *H01M 4/04* (2006.01)
  *H01M 10/0585* (2010.01)
  *H01M 4/134* (2010.01)
  *H01M 10/0525* (2010.01)
  *H01M 4/38* (2006.01)
  *H01M 4/74* (2006.01)
  *H01M 10/052* (2010.01)
  *H01M 4/80* (2006.01)

(52) U.S. Cl.
  CPC ....... *H01M 4/0421* (2013.01); *H01M 4/0452* (2013.01); *H01M 4/0483* (2013.01); *H01M 4/134* (2013.01); *H01M 4/366* (2013.01); *H01M 4/382* (2013.01); *H01M 4/5815* (2013.01); *H01M 4/661* (2013.01); *H01M 4/667* (2013.01); *H01M 4/742* (2013.01); *H01M 4/747* (2013.01); *H01M 4/80* (2013.01); *H01M 10/052* (2013.01); *H01M 10/0525* (2013.01); *H01M 10/0585* (2013.01)

(56) References Cited

U.S. PATENT DOCUMENTS

| | | | |
|---|---|---|---|
| 4,539,052 A | 9/1985 | Palmer et al. | |
| 5,464,707 A * | 11/1995 | Moulton | H01M 4/668 429/212 |
| 5,616,437 A | 4/1997 | Gao | |
| 6,001,139 A | 12/1999 | Asanuma | |
| 6,402,795 B1 | 6/2002 | Chu et al. | |
| 10,797,301 B2 | 10/2020 | Dai et al. | |
| 10,797,353 B2 | 10/2020 | Adair et al. | |
| 2016/0118687 A1 | 4/2016 | Nakanishi | |
| 2016/0240376 A1 | 8/2016 | Yeh et al. | |
| 2016/0301075 A1 * | 10/2016 | Zhamu | H01M 4/587 |
| 2017/0073809 A1 | 3/2017 | Choi et al. | |
| 2017/0324113 A1 | 11/2017 | Mayer | |
| 2017/0338522 A1 | 11/2017 | Hu et al. | |
| 2019/0207211 A1 | 7/2019 | Dai et al. | |

FOREIGN PATENT DOCUMENTS

| | | |
|---|---|---|
| CN | 106784600 A | 5/2017 |
| CN | 110010971 A | 7/2019 |
| DE | 69636385 T2 | 9/2007 |
| DE | 102018133726 A1 | 7/2019 |
| JP | H04126355 A | 4/1992 |
| JP | H0696775 A | 4/1994 |

OTHER PUBLICATIONS

First Office Action for Chinese Patent Application No. 201811524881.1 dated Sep. 13, 2021, with correspondence dated Sep. 15, 2021, from China Patent Agent (H.K.) Ltd summarizing contents; 12 pages.
First Office Action for German Patent Application No. 102018133726.4 dated Jul. 20, 2021; 5 pages.

* cited by examiner

METHOD OF MANUFACTURING AN ELECTROCHEMICAL CELL

CROSS-REFERENCE TO RELATED APPLICATION

This application is a continuation-in-part application of U.S. application Ser. No. 15/862,187 filed Jan. 4, 2018 and incorporated herein by reference in its entirety.

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium batteries generally comprise one or more electrochemical cells including a negative electrode, a positive electrode, a porous separator, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of the lithium ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Uniform and sustained physical contact between the negative and positive electrodes and their respective current collectors is necessary to ensure effective charge transport therebetween and efficient battery operation throughout the life of the battery.

SUMMARY

In a method of manufacturing an electrochemical cell, a porous or non-porous metal substrate may be provided. A precursor solution including a chalcogen donor compound dissolved in a solvent also may be provided. The precursor solution may be applied to a surface of the metal substrate such that the chalcogen donor compound reacts with the metal substrate and forms a conformal metal chalcogenide layer on the surface of the metal substrate. A conformal lithium metal layer may be formed on the surface of the metal substrate over the metal chalcogenide layer.

In one form, the chalcogen donor compound may comprise an oxygen donor compound. In such case, the conformal metal chalcogenide layer may comprise a metal oxide. The oxygen donor compound may comprise at least one of a metal oxo complex, a nitroxide, a phosphine oxide, a peroxide, a superoxide, or a metal salt including an oxyanion. For example, the oxygen donor compound may comprise at least one of sodium hypochlorite, (2,2,6,6-tetramethylpiperidin-1-yl)oxyl, triphenylphosphine oxide, benzoyl peroxide, or potassium dichromate.

In another form, the chalcogen donor compound may comprise a sulfur donor compound. In such case, the conformal metal chalcogenide layer may comprise a metal sulfide. The sulfur donor compound may comprise at least one of 2,2,6,6-tetramethylpiperidin-1-ylthiyl (TEMPS), an organic polysulfide, or an inorganic polysulfide.

In yet another form, the chalcogen donor compound may comprise a selenium donor compound. In such case, the conformal metal chalcogenide layer may comprise a metal selenide. The selenium donor compound may comprise at least one of an organic polyselenide or an inorganic polyselenide.

The precursor solution may be applied to the surface of the metal substrate by spraying or coating the precursor solution onto the surface of the metal substrate, or by at least partially immersing the metal substrate in the precursor solution.

The metal chalcogenide layer may have a thickness in the range of one nanometer to 10 micrometers.

In one form, the metal substrate comprises a non-porous metal foil, a perforated metal sheet, or a porous metal mesh. In such case, the metal substrate may have a thickness in the range of 8 μm 20 μm.

In another form, the metal substrate may be porous and may include a first side, an opposite second side, and a plurality of pores defined by wall surfaces extending between the first and second sides of the metal substrate. In such case, the precursor solution may be applied to the metal substrate such that the metal chalcogenide layer forms on the first and second sides of the metal substrate and on the wall surfaces extending between the first and second sides of the metal substrate, without blocking the pores of the metal substrate. The metal substrate may have a thickness in the range of 50 μm to 150 μm.

The metal substrate may comprise copper. In such case, the metal chalcogenide layer may comprise copper oxide, copper sulfide, copper selenide, or a combination thereof.

In one form, the lithium metal layer may be formed on the surface of the metal substrate over the metal chalcogenide layer by contacting the metal chalcogenide layer with a source of gaseous or molten lithium such that the lithium actively wets the metal chalcogenide layer and is uniformly distributed over the surface of the metal substrate.

In another form, the lithium metal layer may be formed on the surface of the metal substrate over the metal chalcogenide layer using an electrochemical deposition process. In such case, the metal substrate may be at least partially immersed in a nonaqueous liquid electrolyte solution that includes a lithium salt dissolved in a polar aprotic organic solvent. Then an electrical potential may be established between the metal substrate and a counter electrode immersed in the nonaqueous liquid electrolyte solution such that lithium ions in the electrolyte solution are reduced to metallic lithium and deposited on the surface of the metal substrate over the metal chalcogenide layer.

DETAILED DESCRIPTION

The presently disclosed method is directed to the manufacture of an electrochemical cell includes lithium metal as a negative electrode material and thus exhibits relatively high energy density, as compared to electrochemical cells that include other elements or compounds as negative electrode materials. During manufacture of the electrochemical cell, a robust physical and chemical bond is formed between the lithium metal and a surface of a negative electrode current collector via formation of an intermediate metal chalcogenide layer. The metal chalcogenide layer helps the lithium metal adhere to the surface the negative electrode current collector and allows for the formation of a superior bond between the lithium metal negative electrode layer and the negative electrode current collector, while also improving the coulombic efficiency of the negative electrode layer and without adversely impacting the impedance of the electrochemical cell, as compared to electrochemical cells that include lithium metal negative electrode layers formed directly on their negative electrode current collectors. Formation of the intermediate metal chalcogenide layer also allows for formation of thin uniform lithium metal layers on porous and non-porous negative electrode current collectors having a variety of different configurations.

Figure 1:
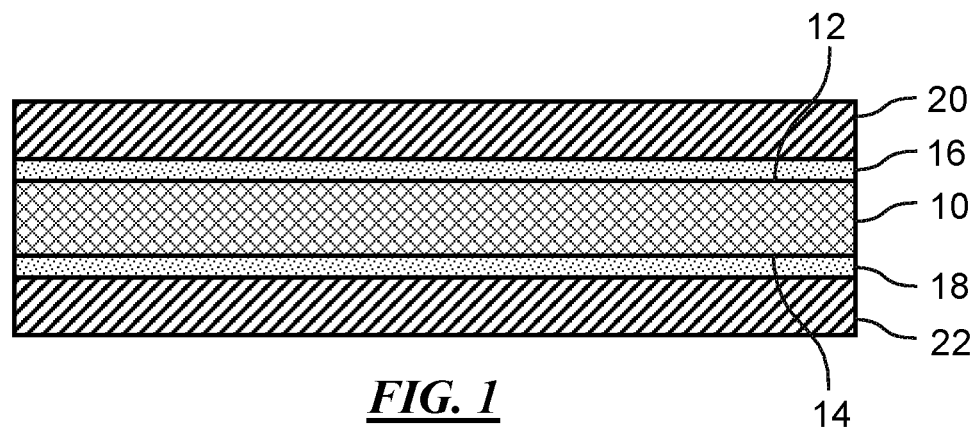
FIG. 1 is a side cross-sectional view of a negative electrode current collector having a first lithium metal negative electrode layer and a first intermediate metal chalcogenide layer formed on a first major surface thereof, and a second lithium metal negative electrode layer and a second metal chalcogenide layer formed on a second major surface thereof.

FIG. 1 illustrates in idealized fashion a side cross-sectional view of a negative electrode current collector 10 for an electrochemical cell (not shown) of a secondary lithium metal battery (not shown). The negative electrode current collector 10 includes a first major surface 12 and an opposite second major surface 14. A thin first metal chalcogenide layer 16 is formed directly on the first major surface 12 of the current collector 10, and a thin second metal chalcogenide layer 18 is formed on the second major surface 14 of the current collector 10. In addition, a first lithium metal negative electrode layer 20 is formed directly on the first metal chalcogenide layer 16 over the first major surface 12 of the current collector 10, and a second lithium metal negative electrode layer 22 is formed directly on the second metal chalcogenide layer 18 over the second major surface 14 of the current collector 10.

In assembly, the negative electrode current collector 10 may be electrically coupled to a positive electrode current collector (not shown) which may be coated on one of both sides with a positive electrode layer. A porous separator layer (not shown) may be sandwiched between one of the first or second lithium metal negative electrode layers 20, 22 of the negative electrode current collector 10 and an opposing positive electrode layer of the positive electrode current collector so that lithium ions can flow through the separator layer between the opposing negative and positive electrode layers while electrons simultaneously travel between the negative and positive electrode layers via an external circuit.

The first and second metal chalcogenide layers 16, 18 chemically and physically bond the first and second lithium metal negative electrode layers 20, 22 to the first and second major surfaces 12, 14 of the current collector 10. The metal chalcogenide layers 16, 18 may be "lithiophilic," meaning that lithium has an affinity for the metal chalcogenide layers 16, 18 and actively wets the chalcogenide layers 16, 18. As such, the metal chalcogenide layers 16, 18 may help the lithium metal negative electrode layers 20, 22 adhere to the first and second major surfaces 12, 14 of the current collector 10 and also may help maintain electrical contact between the negative electrode layers 20, 22 and the negative electrode current collector 10 during operation and/or movement of the electrochemical cell. For example, the metal chalcogenide layers 16, 18 may help prevent delamination or separation of the negative electrode layers 20, 22 from the negative electrode current collector 10 during bending or flexing of the electrochemical cell. In addition, the metal chalcogenide layers 16, 18 may promote wetting of the lithium metal negative electrode layers 20, 22 on the first and second major surfaces 12, 14 of the negative electrode current collector 10 during manufacture of the electrochemical cell and during subsequent charging cycles.

The negative electrode current collector 10 may comprise any material that is capable of collecting and reversibly passing free electrons to and from the negative electrode layers 20, 22. For example, the negative electrode current collector 10 may comprise an electrically conductive metal or metal alloy, e.g., a transition metal or alloy thereof. In some specific examples, the negative electrode current collector 10 may comprise copper (Cu), nickel (Ni), an iron (Fe) alloy (e.g., stainless steel), or titanium (Ti). Other electrically conductive metals may of course be used, if desired.

The negative electrode current collector 10 may be in the form of a thin and flexible porous or non-porous metal substrate. For example, the negative electrode current collector 10 may be in the form of a thin and flexible non-porous metal foil, a porous metal mesh, a perforated metal sheet, or a porous open cell metal foam. The specific configuration of the negative electrode current collector 10 may depend upon the intended application of use. The negative electrode current collector 10 may have a thickness in the range of 8 micrometers to 150 micrometers. For example, in embodiments where the negative electrode current collector 10 is in the form of a non-porous metal foil, a porous metal mesh, or a perforated metal sheet, the current collector 10 may have thicknesses in the range of 8 micrometers to 20 micrometers. As another example, in embodiments where the negative electrode current collector 10 is in the form of porous open-cell metal foams, the current collector 10 may have thicknesses in the range of 50 micrometers to 150 micrometers.

In FIG. 1, the first and second major surfaces 12, 14 of the current collector 10 are depicted as being substantially flat, which may be the case in embodiments where the current collector 10 comprises a metal foil or a perforated metal sheet. However, in other embodiments, for example, where the current collector 10 comprises a metal mesh or an open-cell metal foam, the surfaces 12, 14 of the current collector 10 may be contoured and the layers 16, 18, 20, 22 may substantially conform to the contours thereof. For example, in some embodiments, the current collector 10 may comprise an open-cell metal foam (not shown) having a plurality of open interconnected pores defined by wall surfaces that extend between a first side and an opposite second side of the current collector 10. In such case, a metal chalcogenide layer and an overlying lithium metal negative electrode layer may be formed on the current collector 10 and on the wall surfaces extending between the first and second sides of the current collector 10.

The first and second metal chalcogenide layers 16, 18 each may comprise a transition metal chalcogenide (e.g., an oxide, sulfide, and/or selenide of copper (Cu), nickel (Ni), iron (Fe), and/or titanium (Ti)). For example, one or both of the metal chalcogenide layers 16, 18 may comprise a transition metal chalcogenide represented by one or more of the following formulas: $Me_2Ch$, $MeCh_2$, $MeCh$, or $Me_2Ch_3$, where Me is a transition metal (e.g., Cu, Ni, Fe, and/or Ti) and Ch is a chalcogen (e.g., O, S, and/or Se). The composition of the metal chalcogenide layers 16, 18 may depend on the composition of the negative electrode current collector 10. For example, in embodiments where the negative electrode current collector 10 comprises copper (Cu), the metal chalcogenide layers 16, 18 may comprise copper oxide (e.g., CuO and/or $Cu_2O$), copper sulfide (e.g., CuS and/or $Cu_2S$), and/or copper selenide (e.g., CuSe and/or $Cu_2Se$). Additionally or alternatively, the metal chalcogenide layers 16, 18 may comprise a lithium chalcogenide (e.g., an oxide, sulfide, and/or selenide of lithium). For example, the metal chalcogenide layers 16, 18 may comprise a lithium (Li) chalcogenide having the formula $Li_2Ch$, where Ch is a chalcogen (e.g., O, S, and/or Se). In some embodiments, the metal chalcogenide layers 16, 18 may comprise a composite of one or more transition metal chalcogenides and one or more lithium chalcogenides. The chalcogenides included in the metal chalcogenide layers 16, 18 may be stoichiometric or non-stoichiometric. The metal chalcogenide layers 16, 18 may have thicknesses in the range of one nanometer to 10 micrometers.

The lithium metal negative electrode layers 20, 22 may consist essentially of lithium (Li) metal. For example, the lithium metal negative electrode layers 20, 22 may comprise, by weight, greater than 97% lithium or, more preferably, greater than 99% lithium. However, the negative electrode layers 20, 22 preferably do not comprise any other elements or compounds that undergo a reversible redox reaction with lithium during operation of the electrochemical cell. For example, the negative electrode layers 20, 22 preferably do not comprise an intercalation host material that is formulated to undergo the reversible insertion or intercalation of lithium ions or an alloying material that can electrochemically alloy and form compound phases with lithium. In addition, the negative electrode layers 20, 22 preferably do not comprise a conversion material or an alloy material that can electrochemically alloy and form compound phases with lithium. Some examples of materials that are preferably excluded from the negative electrode layers 20, 22 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybedenum oxide), metal phosphides, metal sulfides, and metal nitrides (e.g., phosphides, sulfides, and/or nitrides or iron, manganese, nickel, copper, and/or cobalt). In addition, the negative electrode layer 12 preferably does not comprise a polymeric binder. Some examples of polymeric binders that are preferably excluded from the negative electrode layer 12 of the present disclosure include polyvinylidene fluoride (PVdF), ethylene propylene diene monomer (EPDM) rubber, styrene butadiene rubber (SBR), carboxymethyl cellulose (CMC), and polyacrylic acid.

The first and second metal chalcogenide layers 16, 18 may be respectively formed on the first and second major surfaces 12, 14 of the current collector 10 by a chemical solution deposition process, wherein a chalcogenide precursor solution is applied to the surfaces 12, 14 of the current collector 10. The chalcogenide precursor solution may be applied to the surfaces 12, 14 of the current collector 10, for example, by immersion, spray, or coating. The chalcogenide precursor solution may be aqueous or nonaqueous and may comprise an organic or inorganic chalcogen donor compound dissolved in a solvent.

The chalcogen donor compound (or chalcogen atom transfer agent) may comprise any compound that can react with the metal of the current collector 10 by donating or transferring a single chalcogen atom (e.g., O, S, and/or Se), or by donating or transferring multiple chalcogen atoms one at a time to the metal of the current collector 10, thereby forming the first and second metal chalcogenide layers 16, 18 on the first and second major surfaces 12, 14 of the current collector 10.

In embodiments where the first and second metal chalcogenide layers 16, 18 comprise metal oxide layers, the chalcogen donor compound may comprise an oxygen donor compound or an oxygen-atom transfer agent. Some examples of oxygen donor compounds include: oxo ($O^{2-}$)-containing compounds (e.g., metal oxo complexes, nitroxides, and phosphine oxides), peroxides (containing an O—O group, $O_2^{2-}$), superoxides (compounds containing an $O_2^-$ anion), metal salts including an oxyanion ($A_xO_y^{z-}$, where A is any chemical element), and combinations thereof. Some examples of oxyanions include: borate ($BO_3^{3-}$), carbonate ($CO_3^{2-}$), nitrate ($NO_3^-$), phosphate ($PO_4^{3-}$), sulfate ($SO_4^{2-}$), chromate ($CrO_4^{2-}$), arsenate ($AsO_4^{3-}$), ferrate ($FeO_4^{3-}$), nitrite ($NO_2^-$), phosphite ($PO_3^{3-}$), sulfite ($SO_3^{2-}$), arsenite ($AsO_3^{3-}$), hypophosphite ($PO_2^{3-}$), hyposulfite ($SO_2^{2-}$), perchlorate ($ClO_4^-$), perbromate ($BrO_4^-$), periodate ($IO_4^-$), permanganate ($MnO_4^-$), chlorate ($ClO_3^-$), bromate ($BrO_3^-$), iodate ($IO_3^-$), chlorite ($ClO_2^-$), bromite ($BrO_2^-$), hypochlorite ($ClO^-$), and hypobromite ($BrO^-$). Some specific examples of oxygen donor compounds include: sodium hypochlorite (NaClO), (2,2,6,6-tetramethylpiperidin-1-yl) oxyl (TEMPO), triphenylphosphine oxide (TPPO), organic peroxides (e.g., benzoyl peroxide), inorganic peroxides (e.g., hydrogen peroxide), potassium dichromate, and combinations thereof.

In embodiments where the first and second metal chalcogenide layers 16, 18 comprise metal sulfide layers, the chalcogen donor compound may comprise a sulfur donor compound or a sulfur-atom transfer agent. Some specific examples of sulfur donor compounds include: 2,2,6,6-tetramethylpiperidin-1-ylthiyl (TEMPS), organic polysulfides (e.g., methyl polysulfide, $(CH_3)_2S_n$, ethyl polysulfide, $(C_2H_5)_2S_n$, and/or benzyl polysulfide, $(C_6H_5CH_2)_2S_n$, where n=2-8), and/or inorganic polysulfides (e.g., lithium polysulfide ($Li_2S_n$), sodium polysulfide, ($Na_2S_n$), and/or potassium polysulfide ($K_2S_n$).

In embodiments where the first and second metal chalcogenide layers 16, 18 comprise metal selenide layers, the chalcogen donor compound may comprise a selenium donor compound or a selenium-atom transfer agent. Some specific examples of selenium donor compounds include organic or inorganic polyselenides, (e.g., lithium polyselenide ($Li_2Se_n$) and/or sodium polyselenide ($Na_2Se_n$), where n=2-8).

The solvent may comprise water ($H_2O$), an alcohol (e.g. ethanol and/or methanol), an ether (e.g. dimethoxyether and/or tetrahydrofuran), or a combination thereof.

The concentration of the chalcogenide donor compound in the chalcogenide precursor solution may be greater than 0.1 M and less than the saturation concentration of the chalcogenide donor compound in the solvent.

The chalcogenide precursor solution may be applied to the surfaces 12, 14 of the current collector 10 at any temperature greater than the freezing point of the solvent and less than the boiling point of the solvent. For example, in one form, the chalcogenide precursor solution may be applied to the surfaces 12, 14 of the current collector 10 at any temperature in the range of 20° C. to 60° C. The surfaces 12, 14 of the current collector 10 may be exposed to the chalcogenide precursor solution for a sufficient duration to form substantially uniform metal chalcogenide layers 16, 18 over the entire surfaces 12, 14 of the current collector 10.

Applying the chalcogenide precursor solution to the surfaces 12, 14 of the current collector 10 allows the chalcogen donor compound to chemically react with the surfaces 12, 14 of the current collector 10 and effectively form the first and second metal chalcogenide layers 16, 18 on the surfaces 12, 14 such that the layers 16, 18 uniformly and effectively conform to the contours of the surfaces 16, 18, regardless of their configuration. In addition, in embodiments where the current collector 10 is porous, applying the chalcogenide precursor solution to the surfaces 12, 14 of the current collector 10 allows the chalcogen donor compound to chemically react with the surfaces 12, 14 of the current collector 10 (as well as any wall surfaces extending between the surfaces 12, 14) and effectively and uniformly form the first and second metal chalcogenide layers 16, 18 thereon, without physically clogging or blocking the pores of the current collector 10.

After formation of the first and second metal chalcogenide layers 16, 18 on the current collector 10, any remaining solvent, unreacted chalcogen donor compounds, and byproducts of the chemical reaction between the chalcogen donor compounds and the current collector 10 should be removed from the surfaces of the metal chalcogenide layers 16, 18, for example, by drying the current collector 10 and the metal chalcogenide layers 16, 18 in air or in an inert atmosphere (e.g., $N_2$) at room temperature (e.g., 25° C.), or at any temperature less than the melting point of the current collector 10.

Thereafter, the first and second lithium metal layers 20, 22 may be respectively formed on the first and second metal chalcogenide layers 16, 18 over the first and second major surfaces 12, 14 of the current collector 10. The first and second lithium metal layers 20, 22 may be formed on the first and second metal chalcogenide layers 16, 18 by any suitable method, for example, by exposing the first and second metal chalcogenide layers 16, 18 to a source of gaseous or molten lithium, or by laminating a first lithium metal foil onto the first metal chalcogenide layer 16 on the first major surface 12 of the current collector 10 and laminating a second lithium metal foil onto the second metal chalcogenide layer 18 on the second major surface 14 of the current collector 10. In one form, the first and second lithium metal layers 20, 22 may be respectively formed on the first and second metal chalcogenide layers 16, 18 over the first and second major surfaces 12, 14 of the current collector 10 using an electrochemical deposition process. In such case, the current collector 10 may be at least partially immersed in a nonaqueous liquid electrolyte solution. The electrolyte solution may include a lithium salt dissolved in a polar aprotic organic solvent. Then, an electrical potential may be established between the current collector 10 and a counter electrode immersed in the liquid electrolyte solution such that lithium ions in the electrolyte solution are reduced to metallic lithium and deposited on the surfaces 12, 14 of the current collector 10 over the metal chalcogenide layers 16, 18.

Figure 2:
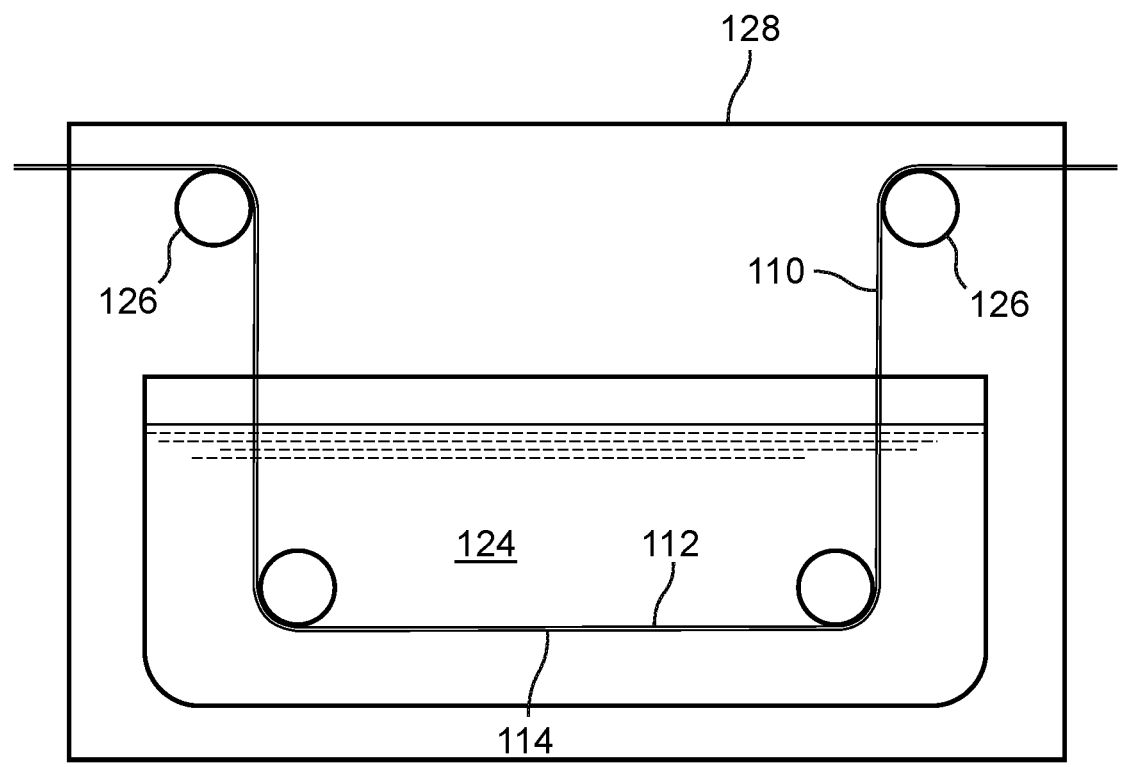
FIG. 2 is a cross-sectional view of an embodiment of an apparatus for forming a metal chalcogenide layer on a surface of a negative electrode current collector using a chemical solution deposition process.

In some embodiments, the first and second metal chalcogenide layers 16, 18 may be formed on the surfaces 12, 14 of the current collector 10 via a continuous process. Referring now to FIG. 2, in a first stage of the process, an electrically conductive metal substrate 110 having a first major surface 112 and an opposite second major surface 114 may be provided. The metal substrate 110 may comprise a continuous metal foil, a metal mesh, or a perforated metal sheet. A chalcogenide precursor solution 124 may be applied to the surfaces 112, 114 of the metal substrate 110 by stretching the metal substrate 100 over a plurality of rollers 126. Thereafter, the rollers 126 may direct the metal substrate 100 into a chamber 128 and into a volume of the chalcogenide precursor solution 124 contained within the chamber 128 such that the metal substrate 110 is immersed in and travels through the chalcogenide precursor solution 124. After the metal substrate 110 is immersed in the chalcogenide precursor solution 124 for a sufficient duration to form a first metal chalcogenide layer and a second metal chalcogenide layer (not shown) on the first and second major surfaces 112, 114 of the metal substrate 110, the rollers 126 may direct the metal substrate 110 out of the chalcogenide precursor solution 124 and out of the chamber 128. Thereafter, first and second lithium metal layers (not shown) may be respectively formed on the first and second major surfaces 112, 114 of the metal substrate 110 over the first and second metal chalcogenide layers. Then, the metal substrate 110 may be formed into the desired size and shape of one or more negative electrode current collectors (not shown) and used in the manufacture of one or more electrochemical cells of a lithium metal battery.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing an electrochemical cell, the method comprising:
   providing a porous or non-porous metal substrate;
   providing a precursor solution including a chalcogen donor compound dissolved in a solvent;
   applying the precursor solution to a surface of the metal substrate such that the chalcogen donor compound reacts with the metal substrate and forms a conformal metal chalcogenide layer directly on the surface of the metal substrate; and
   forming a conformal lithium metal layer directly on the metal chalcogenide layer over the surface of the metal substrate,
   wherein the conformal metal chalcogenide layer is an intermediate layer that extends continuously between the surface of the metal substrate and the conformal lithium metal layer.

2. The method of claim 1 wherein the chalcogen donor compound comprises an oxygen donor compound, and wherein the conformal metal chalcogenide layer comprises a metal oxide.

3. The method of claim 2 wherein the oxygen donor compound comprises at least one of a metal oxo complex, a nitroxide, a phosphine oxide, a peroxide, a superoxide, or a metal salt including an oxyanion.

4. The method of claim 2 wherein the oxygen donor compound comprises at least one of sodium hypochlorite, (2,2,6,6-tetramethylpiperidin-1-yl)oxyl, triphenylphosphine oxide, benzoyl peroxide, or potassium dichromate.

5. The method of claim 1 wherein the chalcogen donor compound comprises a sulfur donor compound, and wherein the conformal metal chalcogenide layer comprises a metal sulfide.

6. The method of claim 5 wherein the sulfur donor compound comprises at least one of 2,2,6,6-tetramethylpiperidin-1-ylthiyl (TEMPS), an organic polysulfide, or an inorganic polysulfide.

7. The method of claim 1 wherein the chalcogen donor compound comprises a selenium donor compound, and wherein the conformal metal chalcogenide layer comprises a metal selenide.

8. The method of claim 7 wherein the selenium donor compound comprises at least one of an organic polyselenide or an inorganic polyselenide.

9. The method of claim 1 wherein the precursor solution is applied to the surface of the metal substrate by spraying or coating the precursor solution onto the surface of the metal substrate, or by at least partially immersing the metal substrate in the precursor solution.

10. The method of claim 1 wherein the metal chalcogenide layer is substantially uniform, and wherein the metal chalcogenide layer has a thickness in the range of one nanometer to 10 micrometers.

11. The method of claim 1 wherein the metal substrate comprises a non-porous metal foil, a perforated metal sheet, or a porous metal mesh.

12. The method of claim 11 wherein the metal substrate has a thickness in the range of 8 μm 20 μm.

13. The method of claim 1 wherein the metal substrate is porous and includes a first side, an opposite second side, and a plurality of pores defined by wall surfaces extending between the first and second sides of the metal substrate, and wherein the precursor solution is applied to the metal substrate such that the metal chalcogenide layer forms on the first and second sides of the metal substrate and on the wall surfaces extending between the first and second sides of the metal substrate, without blocking the pores of the metal substrate.

14. The method of claim 13 wherein the metal substrate has a thickness in the range of 50 μm to 150 μm.

15. The method of claim 1 wherein the metal substrate comprises copper, and wherein the metal chalcogenide layer comprises copper oxide, copper sulfide, copper selenide, or a combination thereof.

16. The method of claim 1 wherein the lithium metal layer is formed on the surface of the metal substrate over the metal chalcogenide layer by contacting the metal chalcogenide layer with a source of gaseous or molten lithium such that the lithium actively wets the metal chalcogenide layer and is uniformly and continuously distributed over the surface of the metal substrate.

17. The method of claim 1 wherein the lithium metal layer is formed on the surface of the metal substrate over the metal chalcogenide layer using an electrochemical deposition process, wherein the metal substrate is at least partially immersed in a nonaqueous liquid electrolyte solution including a lithium salt dissolved in a polar aprotic organic solvent, and then establishing an electrical potential between the metal substrate and a counter electrode immersed in the nonaqueous liquid electrolyte solution such that lithium ions in the electrolyte solution are reduced to metallic lithium and deposited on the surface of the metal substrate over the metal chalcogenide layer.

18. The method of claim 1 wherein the conformal lithium metal layer consists essentially of lithium and comprises, by weight, greater than 97% lithium.

* * * * *